C. M. FYFE.
DARNING AND WEAVING DEVICE.
APPLICATION FILED JUNE 6, 1916.

1,231,346.

Patented June 26, 1917.
7 SHEETS—SHEET 1.

Fig. 1.

WITNESSES
H. J. Walker
C. Bradway

INVENTOR
C. M. Fyfe
BY
ATTORNEYS

C. M. FYFE.
DARNING AND WEAVING DEVICE.
APPLICATION FILED JUNE 6, 1916.

1,231,346.

Patented June 26, 1917.
7 SHEETS—SHEET 3.

WITNESSES
H. T. Walker

INVENTOR
C. M. Fyfe
BY
ATTORNEYS

C. M. FYFE.
DARNING AND WEAVING DEVICE.
APPLICATION FILED JUNE 6, 1916.

1,231,346.

Patented June 26, 1917.
7 SHEETS—SHEET 5.

WITNESSES
H. T. Walker
C. Bradway

INVENTOR
C. M. Fyfe
BY
ATTORNEYS

C. M. FYFE.
DARNING AND WEAVING DEVICE.
APPLICATION FILED JUNE 6, 1916.

1,231,346.

Patented June 26, 1917.
7 SHEETS—SHEET 7.

WITNESSES
H. T. Walker
C. Bradws.

INVENTOR
C. M. Fyfe
BY
ATTORNEYS.

UNITED STATES PATENT OFFICE.

CHARLES M. FYFE, OF BROOKLYN, NEW YORK.

DARNING AND WEAVING DEVICE.

1,231,346.

Specification of Letters Patent.

Patented June 26, 1917.

Application filed June 6, 1916. Serial No. 101,908.

*To all whom it may concern:*

Be it known that I, CHARLES M. FYFE, a citizen of the United States, and a resident of the city of New York, borough of Brooklyn, in the county of Kings and State of New York, have invented a new and Improved Darning and Weaving Device, of which the following is a full, clear, and exact description.

This invention relates to a device for darning or weaving, and it relates more particularly to a machine which is intended to be operated by hand or as an attachment to a sewing machine.

The invention has for its general objects to provide a darning device of the character referred to which is of comparatively simple and inexpensive construction and so designed that darning can be easily and quickly accomplished without any special skill on the part of the user.

A more specific object of the invention is the provision of a darning or weaving machine which embodies a reciprocatory thread-carrying needle movable in a constant path, and in coöperation therewith is a work carrier which is movable step by step when in one position for enabling the warp threads to be laid, and then movable step by step after having turned through ninety degrees more or less to permit the woof threads to be laid, the warp threads being automatically acted on to produce a shed, just as in weaving.

A more specific object of the invention is the provision of a darning device. After the work is applied to the holder, the needle threaded and the parts properly adjusted, the darning operation will be performed entirely by simply turning a crank or operating an equivalent device.

A further object is the provision of a work holder and operating means for moving it step by step in two periods between which the work holder is turned through ninety degrees, and during the turning the shed-forming means is automatically brought into play by being operatively connected with the actuating mechanism.

Another object of the invention is to provide a darning device in the nature of an attachment for a sewing machine, the thread being carried by the needle of the sewing machine and the shuttle of the latter being also employed to cause interlocking of the threads so that the attachment embodies merely a work holder and the means for operating it to cause the laying of the warp and woof threads.

With such objects in view, and others which will appear as the description proceeds, the invention comprises various novel features of construction and arrangement of parts which will be set forth with particularity in the following description and claims appended hereto.

In the accompanying drawings, which illustrate certain embodiments of the invention and wherein similar characters of reference indicate corresponding parts in all the views.

Figure 1:
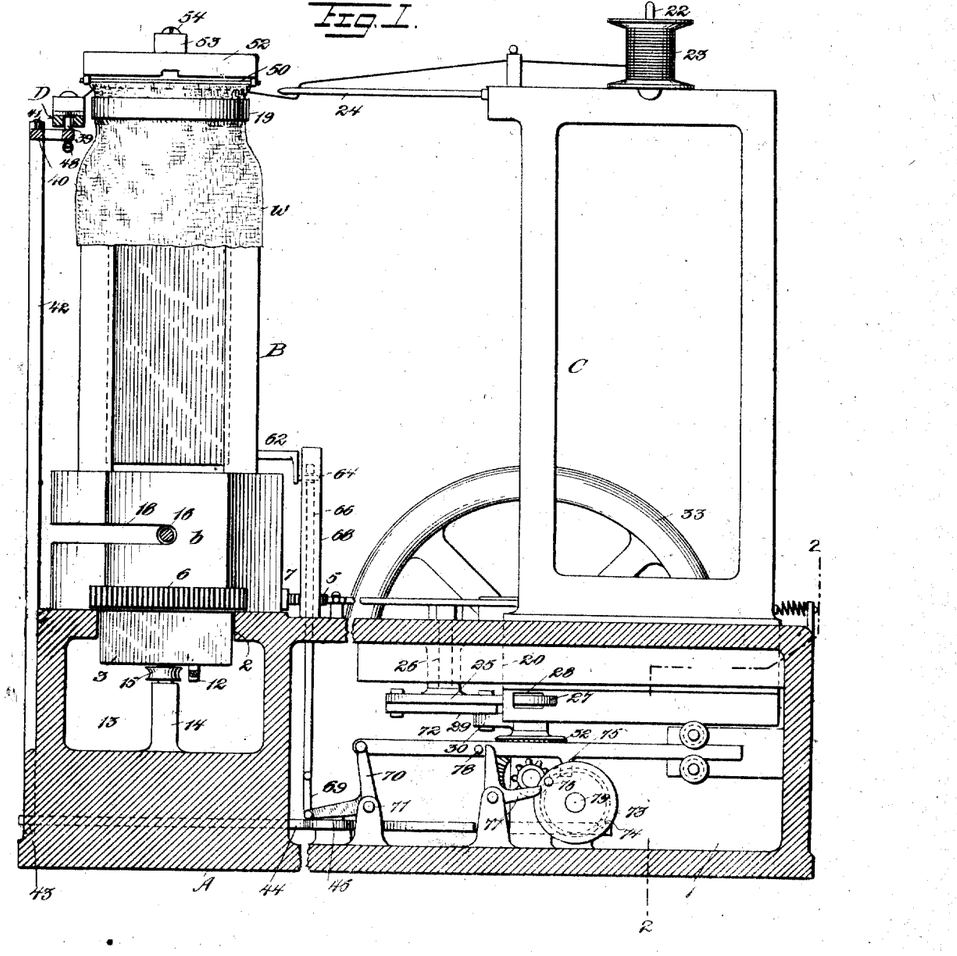
Figure 1 is a vertical sectional view of the darning device taken on the line 1—1, Fig. 2.
Figure 6:
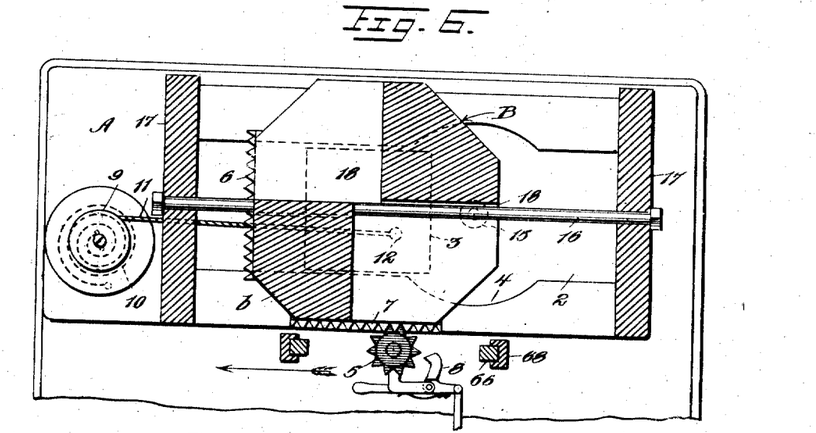
Fig. 6 is a horizontal section on the line 6—6, Fig. 2, showing the means for operating and controlling the movement of the work carrier.
Figure 7:
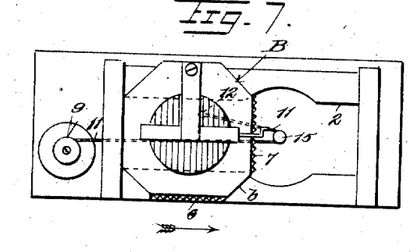
Figs. 7 and 8 are plan views showing respectively the work carrier at the beginning of the first and second periods of its movement.
Figure 8:
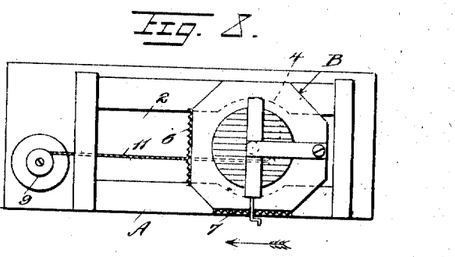
Figure 15:
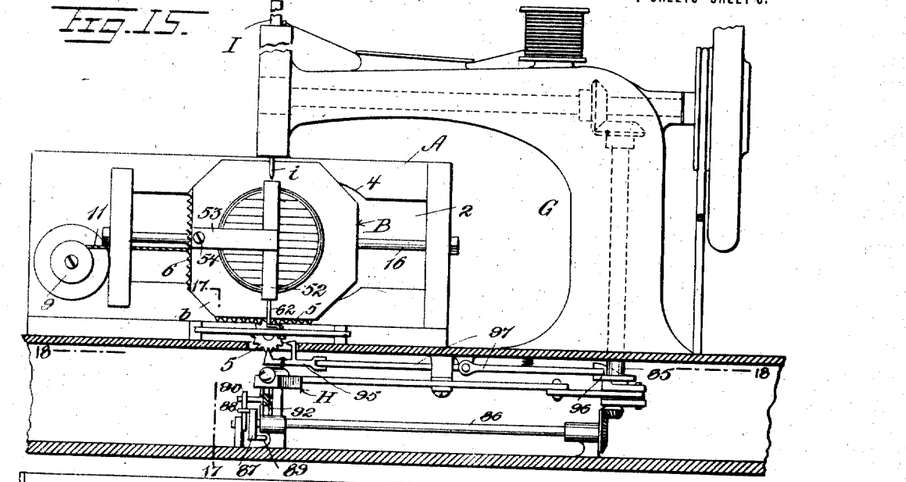
Fig. 15 is a view of the attachment applied to a sewing machine, which latter is partially in section on the line 15—15, Fig. 16.
Figure 16:
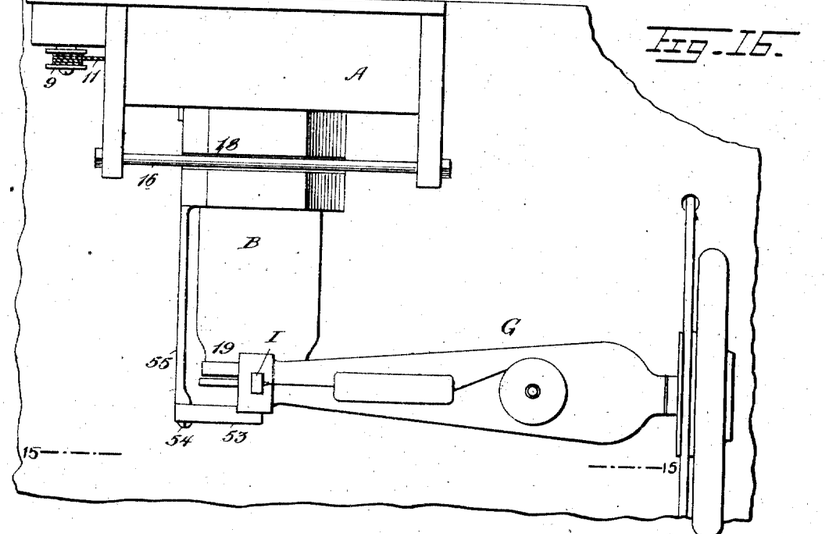
Fig. 16 is a plan view of the attachment applied to a sewing machine.
Figure 17:
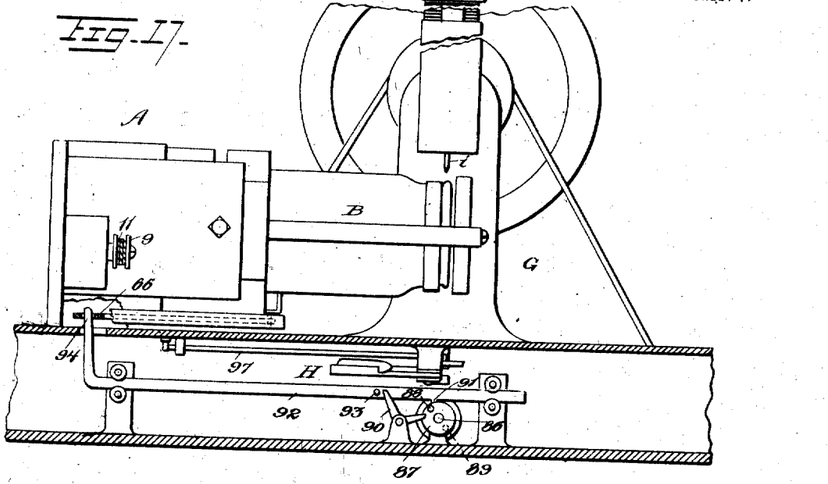
Fig. 17 is an end view of the attachment with a portion of the machine in section on the line 17—17, Fig. 15.
Figure 18:
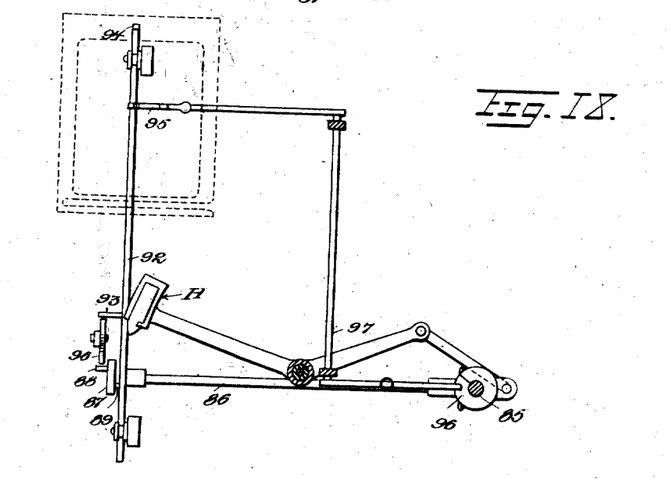
Fig. 18 is a detail view of the shuttle mechanism of the sewing machine and the connection thereof with the attachment.

Referring to the drawing, A designates the bed of the machine, which is formed with a chamber 1 for containing the various shafts, gears, etc., for operating the instrumentalities by which the darning or weaving is done. The rear part of the bed is provided with a longitudinal slot 2 by which is guided the work holder B. At the front of the bed is a needle frame C which moves back and forth to lay the warp and woof threads. The work carrier B is shown as a column which is upright, as in Fig. 1, or horizontal in case of a sewing machine darning attachment, as shown in Figs. 15 to 17 inclusive. The bottom of this carrier body has a non-circular base 3 which has a horizontal movement in the slot 2 with which it fits in such a manner that the carrier is prevented from turning, except when the non-circular portion 3 is in that portion of the slot having the recesses 4, Fig. 6. When the non-circular portion is in line with these recesses the work holder B can turn about its own vertical axis as a center, this turning being understood by comparing Figs. 7 and 8. When the work carrier moves from the position shown in Fig. 7 to that shown in Fig. 8 the warp threads are laid, and as the work carrier moves to the left from the position shown in Fig. 8 to its initial position, the woof threads are laid. The work carrier is moved during the warp and woof laying periods step by step, the movement being controlled by a star wheel 5 which meshes with either one of the racks 6 or 7 disposed respectively at adjacent sides of the body b of the carrier. The star wheel is controlled by an escapement 8, so that the wheel can turn step by step, and this in turn controls the step by step movement of the carrier. The movement is produced by a motor which is in the form of a winding drum 9 fastened to the top of the bed A, this drum being actuated by a spring 10, and winding around the drum is a flexible element 11 which extends under the carrier and connects with a lug 12 depending from the bottom thereof. Within the chamber 13, under the slot 2, is a fixed post 14 which has a pulley 15 disposed to rotate on a vertical axis, and lying in the plane of the flexible element or cord 11. This cord is adapted to pass around the guide pulley 15 in placing the work holder in its starting position, as shown in Fig. 7. In moving the work holder to this position the drum 9 unwinds and its spring is placed under a strong tension, which tends to draw the work carrier back to its final position. The pull on the cord 11 is always in one direction, yet it produces a movement of the work carrier first to the right from the position shown in Fig. 7 and when the limit to the right is reached it imparts a quarter turn to the work carrier, as shown in Fig. 8; and thereafter the latter moves to the left from the position shown in Fig. 8. When moving to the right the star wheel is in engagement with the rack bar 6 so that the movement to the right is step by step, each step being so timed that the needle can pass back and forth once through the work. When the work holder travels to the left the star wheel is in engagement with the rack bar 7, which causes the step by step movement so that intermediate each step a back and forth woof thread can be laid. The work carrier is retained on the bed by a horizontal rod 16 fastened at its ends to upright flanges 17, and this rod extends through a passage 18 in the body, the passage being formed of two quadrant recesses disposed with their vertices meeting, as shown in Fig. 6, so that sufficient clearance is provided to permit the work holder to turn through ninety degrees.

The work w is applied around the upper end of the work holder and clamped by an elastic band 19 or equivalent means, the opening to be darned being stretched across the top of the work holder. After the work is thus applied the holder B is moved to the right until the position shown in Fig. 8 is reached, when the holder is turned anti-clockwise through ninety degrees, and then it is moved to the left. During this placing of the work holder to starting position, the escapement 8 can be held out of engagement with the escapement or star wheel 5, to permit the latter to freely rotate.

Figure 3:
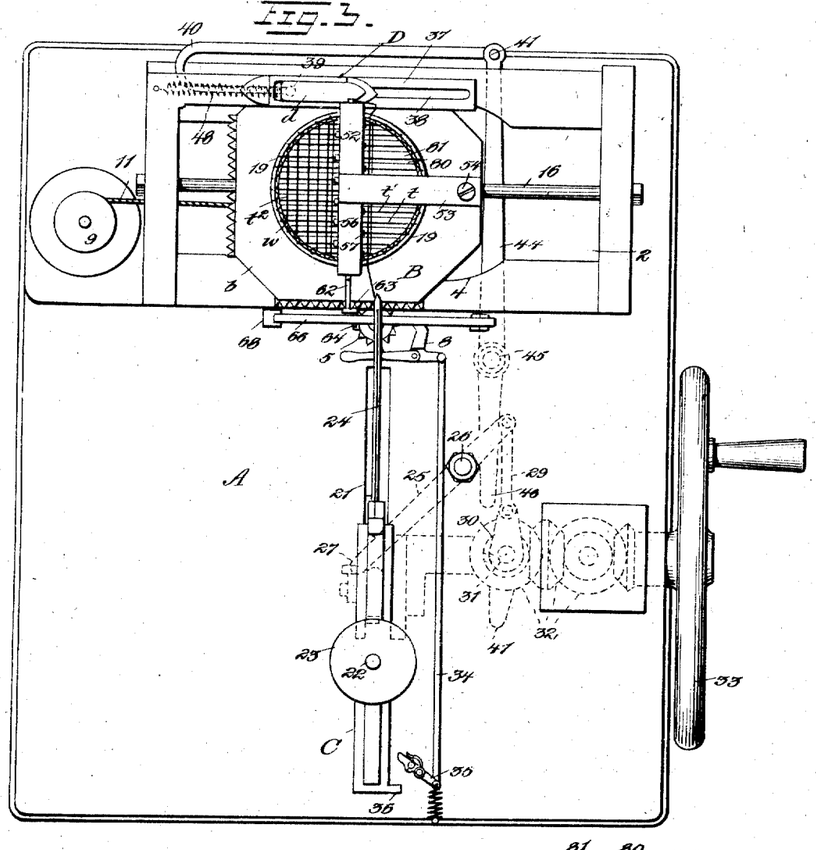
Fig. 3 is a plan view of the darning device.
Figure 4:
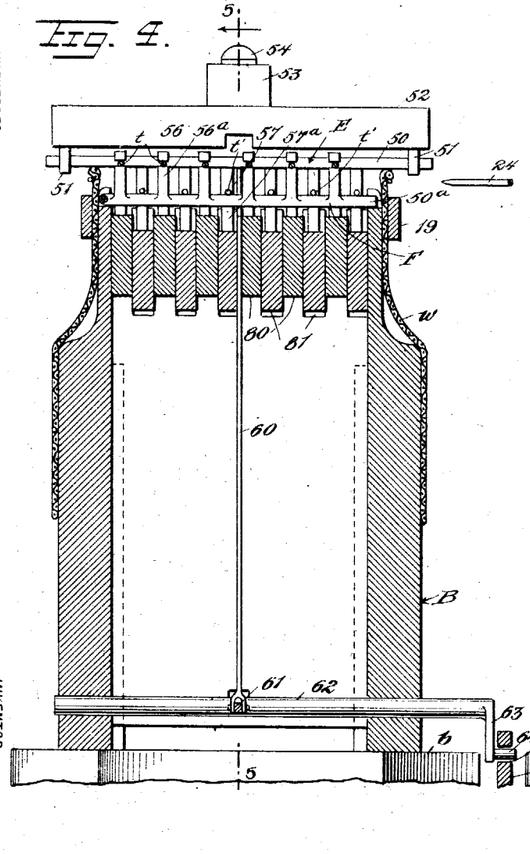
Fig. 4 is a vertical section of the work holder or carrier on the line 4—4, Fig. 5.

The needle frame C is of any desired construction and its base portion 20 reciprocates in a slot 21 in the top of the bed A. The top of the needle frame is provided with a spindle 22 on which is a spool 23 from which the thread feeds to the needle 24. This needle is of that type having an eye adjacent its point and it is of a length dependent on the capacity of the work holder. The needle is horizontal and reciprocates over the top of the work holder so that the warp and woof threads will be laid in a horizontal plane, except in case of the attachment for the sewing machine, wherein the warp and woof threads are laid in a vertical plane, since the work holder is supported on its side. The needle frame C is reciprocated by a lever 25 disposed in the chamber 1 and mounted on a fulcrum bolt 26. This lever has a free end 27 working through a slot 28 in the base of the frame C, and the lever is connected by a link 29 with a crank 30 mounted on a vertical shaft 31. This shaft is connected by a train of gears 32 with an operating wheel or crank 33 disposed to one side of the bed, the gears being housed within the chamber 1. The escapement lever 8 is oscillated by a rod 34 which is connected with a lever 35 that receives motion from the needle frame by the free end of the lever being in the path of a lug 36 or equivalent means on the needle frame, as shown in Fig. 3.

Figure 9:
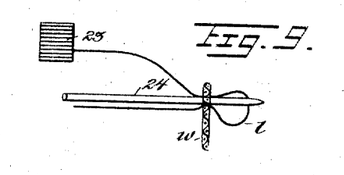
Figs. 9 to 11 are detail views showing the steps of interlocking the warp or woof threads with the shuttle thread.
Figure 10:
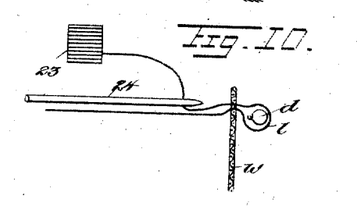
Figure 11:
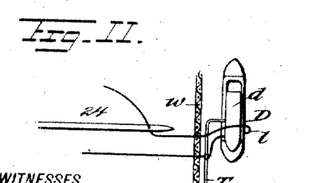
Figure 12:
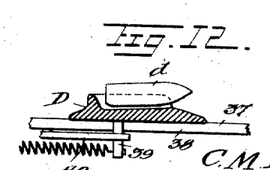
Fig. 12 is a detail sectional view of the shuttle carrier.
Figure 13:
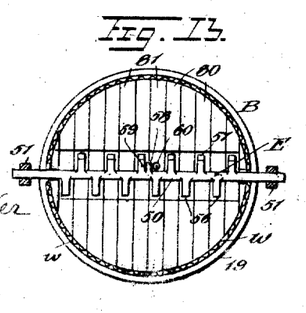
Figs. 13 and 14 are views of the shed-forming elements.
Figure 14:
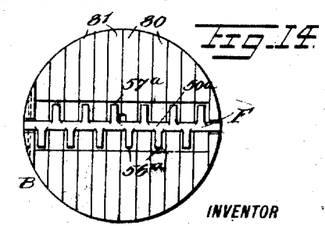

At the side of the work carrier B opposite from the needle 24 is a shuttle carrier D which slides back and forth on a guide 37 which has a slot 38 for accommodating the pin 39 on the reciprocatory actuating bar 40, said pin extending upwardly through the slot 38 and connecting with the shuttle carrier D. By this means the shuttle $d$ is passed through the loop of the warp or woof threads with each stroke of the needle, as shown in Figs. 9 to 11 inclusive. The actuating rod 40 is pivotally connected at 41 with the upper end of a post 42, the lower end of which extends downwardly to the bed A, where it connects at 43 with a lever 44 fulcrumed at 45 in the bed A. This lever has a free end 46 which is adapted to be engaged by a wiper 47 on the shaft 31, so that with each rotation of the shaft the lever 44 is moved in one direction to move the shuttle carrier also in one direction, and at the same time a spring 48 is placed under tension to cause the lever and shuttle carrier to move in the opposite direction when the arm or wiper 47 passes the lever.

Figure 2:
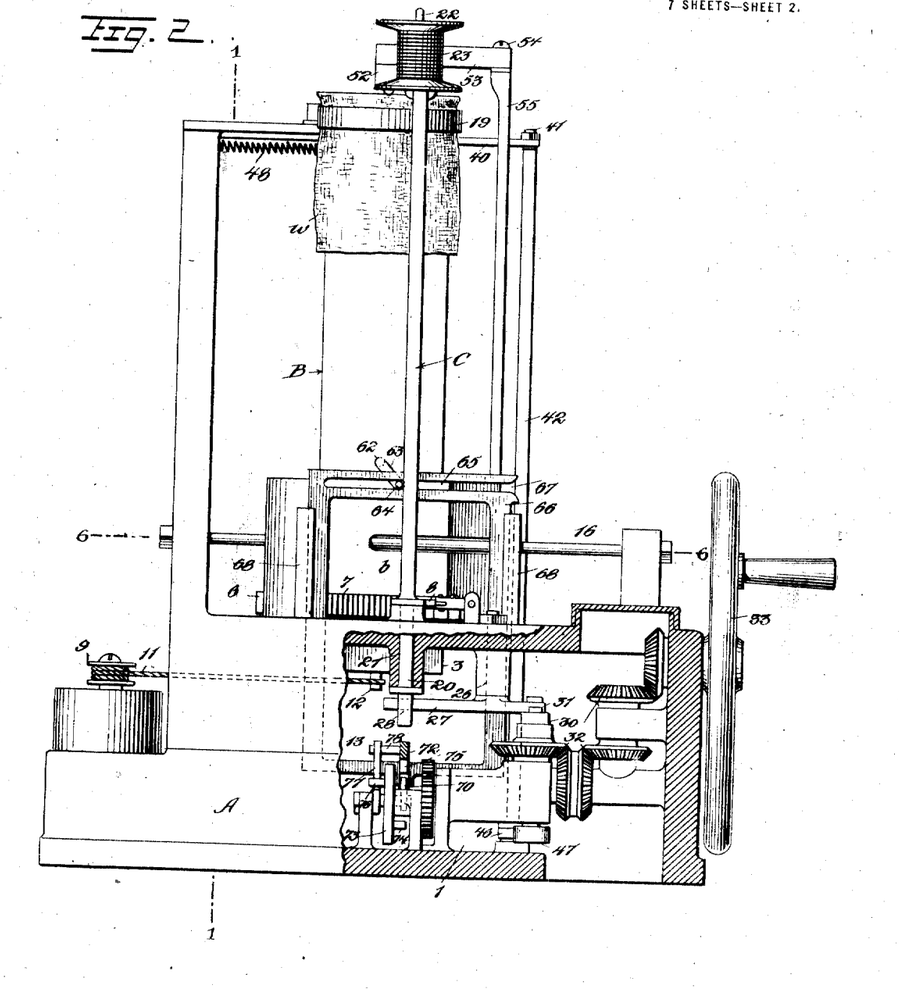
Fig. 2 is an elevation with portions in section on the line 2—2, Fig. 1.
Figure 5:
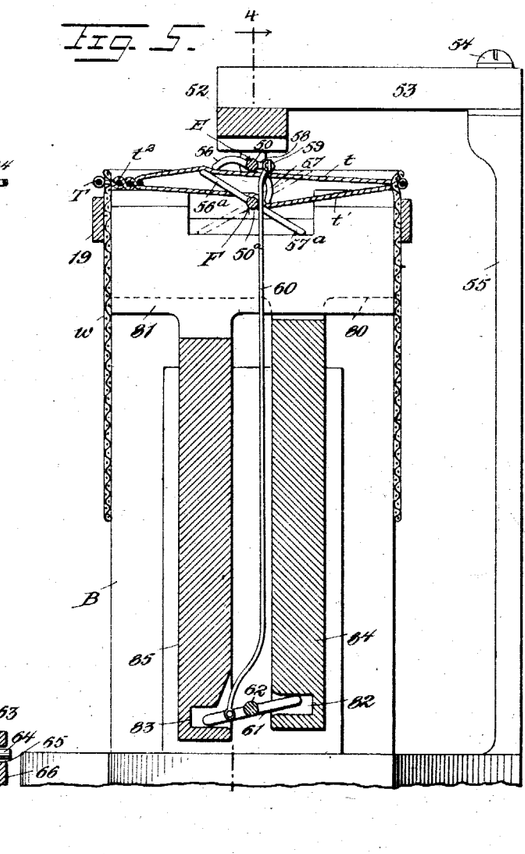
Fig. 5 is a sectional view on the line 5—5, Fig. 4.

In order to lay the woof threads it is necessary to form the warp threads into a shed. For this purpose oscillating heddles E and F are arranged across the upper or operative portion of the work holder B. The upper heddle device E is a bar 50 journaled in bearings 51 on a cross bar 52 carried by a bracket 53. This bracket 53 is connected by a pivot fastener 54 to the upper end of a standard 55 which rises from the body of the work holder so as to move therewith. The bracket or arm 53 can be swung to one side from the normal position shown so as to permit the work to be easily adjusted to the work holder. The shaft or bar 50 has spaced fingers 56 projecting from one side and spaced fingers 57 projecting from the opposite side, the fingers 56 alternating with the fingers 57, and the fingers are adapted to engage the warp threads alternately. The shaft 50 may be oscillated in any suitable manner, as, for instance, by means of an arm 58 detachably connected at 59 with a rod 60. This rod has its lower end connected with an arm 61 on a rock shaft 62 which in turn has a crank arm 63, the pin 64 of which is adapted to engage in a slot 65 of an actuating frame 66. As shown in Fig. 2, the slot 65 has an open end or mouth 67 so that the crank pin 64 can move into the slot when the work carrier makes a quarter turn after the warp threads have been laid and the work is ready to receive the woof threads. In Figs. 1 to 4 and 8 the work carrier is in a position for the laying of the woof threads, and consequently the crank pin 64 will be engaged with the actuating frame 66, but during the laying of the warp threads the crank is disposed ninety degrees from the actuating frame 66, as will be clearly apparent by a comparison of Figs. 7 and 8. The frame 66 moves in vertical guides 68 on the bed, and its lower end is connected by a link 69, Fig. 1, with a bell-crank lever 70 fulcrumed at 71 in the chamber 1. A bar 72 is connected with this lever and is reciprocated in any suitable manner, as, for instance, by a wheel 73 which has a pin 74 arranged to engage a lug 75 on the rod 72 and move the same to the right, Fig. 1, and it also has a pin 76 arranged to engage a lever 77 which in turn engages a lug 78 on the rod 72 to move the latter to the left, it being assumed that the wheel 73 turns in a clockwise direction. The wheel 73 is mounted on a shaft 79 which is rotated by the train of gears 32 from the hand-wheel 33. The lower heddle device F comprises a rock shaft $50^a$ which has oppositely disposed sets of fingers $56^a$ and $57^a$ arranged in alinement with the fingers 56 and 57. The fingers 56, $56^a$ engage every other warp thread $t$, Figs. 4 and 5, to raise or lower the same, while the fingers 57, $57^a$ engage the remaining warp threads $t'$ to lower or raise the same, whereby the shed is formed for the passage of the needle in laying the woof threads. A few of the woof threads $t^2$ are shown as having been laid in Fig. 5. The top surface of the work holder may be formed by alternating sets of bars 80 and 81 which lie respectively under the fingers 56 and 57. These bars reciprocate in synchronism with the oscillation of the heddles so as to allow clearance for the threads in forming the shed. When all the bars are in mid position or flush they lie close to the warp threads when they are not in shed formation. As the bars 80 move upwardly the bars 81 move downwardly, this being accomplished by the lever 61, Fig. 5, engaging in recesses 82 and 83 in the members 84, 85, which carry the bars 80 and 81.

After the work $w$ is adjusted to the holder B and the latter is moved to the position shown in Fig. 7 and the needle 24 is threaded, the handwheel 33 is operated. The needle passes through the edge of the work at the opening where the work is to be darned, and warp threads are laid back and forth across the opening as the work holder moves step by step and as the needle reciprocates, the thread T from the shuttle interlocking with the successive-loops $l$ after the manner shown in Figs. 9 to 11 inclusive. After the opposite side of the opening has been reached the work holder B turns through ninety degrees and the warp threads are formed into a shed so that the needle can pass the woof thread through the shed. The woof threads are interlocked with the shuttle thread T as the shuttle is fixed as to its movement relatively to the needle. When the laying of the woof threads is finished the machine is stopped and the upper heddle device E is disconnected from the rod 60, so that the bracket 53 with the parts that it carries can be swung to one side for permitting the work to be removed. During the laying of the warp threads the needle passes between the upper and lower heddle devices E and F. The fingers of the heddle devices are so shaped that they do not interfere with the passage of the needle through the shed in laying the woof threads at the middle part of the opening to be darned.

Referring to Figs. 15 to 18 inclusive, the darning or weaving device is shown in connection with a sewing machine G. The regular mechanism of the sewing machine is employed with the necessary additions to operate the work carrier and the heddle devices. The darning device is essentially of the same construction as the device already described, except that the shuttle carrier is dispensed with, since the shuttle carrier H of the sewing machine takes its place, and furthermore, the needle frame is no longer required, since the needle bar I takes its place. The shuttle operating shaft 85 of the sewing machine is operatively connected by any suitable means with the heddle actuating frame 66. In the present instance the operating connection comprises a shaft 86 geared to the shaft 85, and on this shaft 86 is a disk 87 having pins 88 and 89 which engage respectively a lever 90 and a lug 91 on the longitudinally movable bar 92. The lever 90 is engageable with a lug 93 on the bar 92 to move the bar in one direction, while the pin 89 engaging the lug 91 moves the bar in the opposite direction. This bar 92 is connected at 94 with the heddle actuating frame 66. The same shaft 85 controls the actuation of the escapement 95 of the star wheel 5. This escapement 95 is operated by any suitable means, such, for instance, as a cam 96 on the shaft 85 operating through the lever 97 or equivalent means. The darning device is laid on its side on the bed of the sewing machine, and the work holder B moves horizontally first to the right, Fig. 15, during the laying of the warp threads by the needle $i$, and then after turning through ninety degrees the work carrier B moves to the left for the laying of the woof threads.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A device of the class described comprising a work carrier, a needle having a fixed path of reciprocation, means for moving the carrier in one direction for laying the warp threads in the work on the carrier, means for turning the carrier after the warp threads are laid, and means for moving the carrier again past the needle in the opposite direction for laying the woof threads.

2. A device of the class described comprising a work carrier, a needle having a fixed path of reciprocation, means for moving the carrier in one direction for laying the warp threads in the work on the carrier, means for turning the carrier after the warp threads are laid, means for moving the carrier again past the needle in the opposite direction for laying the woof threads, and heddle means operative only during the laying of the woof threads.

3. In a device of the class described, a work carrier movable first in one direction and then in the opposite direction and adapted to partially turn before beginning its second movement, and a reciprocatory needle for producing interwoven threads in the work on the carrier.

4. In a device of the class described, a work carrier having a back and forth movement and a partial turning movement before its backward movement, a flexible element connected with the carrier, a fixed abutment around which the flexible element extends, whereby a pull on the element in only one direction causes the forward, turning and backward movement of the carrier, and means for successively producing warp and woof threads in the work on the carrier.

5. In a device of the class described, a work carrier having a back and forth movement and a partial turning movement before its backward movement, a flexible element connected with the carrier, a fixed abutment around which the flexible element extends, whereby a pull on the element in only one direction causes the forward, turning and backward movement of the carrier, means for successively producing warp and woof threads in the work on the carrier, and a spring-actuated winding device on which the said element winds for moving the carrier, said winding device being placed under tension in setting the carrier in its initial position.

6. In a machine of the class described, the combination of a bed having a straight guideway, a work carrier movable forwardly and backwardly in the guideway and turning therein before moving backwardly, a flexible element connected with the work carrier at a point eccentric to its axis, an abutment in the guideway and lying in the center plane of the carrier, whereby the flexible element passes around the abutment in the setting of the carrier in its initial position, and means for producing a continuous pull on the element for moving the carrier forwardly, then turning the carrier through ninety degrees, and finally moving the carrier backwardly.

7. An apparatus of the class described comprising a work carrier mounted to reciprocate and to turn at the end of its forward reciprocation, a needle for producing warp and woof threads in the work on the carrier, and oscillatory heddle devices arranged above and below the warp threads and having oppositely extending fingers engaging the warp threads to alternately form a shed for receiving the woof threads.

8. An apparatus of the class described comprising a work carrier mounted to reciprocate and to turn at the end of its forward reciprocation, a needle for producing warp and woof threads in the work on the carrier, oscillatory heddle devices arranged above and below the warp threads and having oppositely extending fingers engaging the warp threads to alternately form a shed for receiving the woof threads, and means connected with one heddle for positively actuating the same and causing said heddle device to actuate the other one.

9. An apparatus of the class described comprising a work carrier mounted to reciprocate and to turn at the end of its forward reciprocation, a needle for producing warp and woof threads in the work on the carrier, oscillatory heddle devices arranged above and below the warp threads and having oppositely extending fingers engaging the warp threads to alternately form a shed for receiving the woof threads, means connected with one heddle for positively actuating the same and causing said heddle device to actuate the other one, a reciprocating element located at a fixed point with respect to the path of movement of the carrier and with which the heddle actuating means automatically engages after the work carrier has turned for actuating the heddle devices only during the backward movement of the work carrier.

10. An apparatus of the class described comprising a work carrier mounted to reciprocate and to turn at the end of its forward reciprocation, a needle for producing warp and woof threads in the work on the carrier, oscillatory heddle devices arranged above and below the warp threads and having oppositely extending fingers engaging the warp threads to alternately form a shed for receiving the woof threads, means connected with one heddle for positively actuating the same and causing said heddle device to actuate the other one, a reciprocating element located at a fixed point with respect to the path of movement of the carrier and with which the heddle actuating means automatically engages after the work carrier has turned for actuating the heddle devices only during the backward movement of the work carrier, and a support for the positively actuated heddle device, whereby the latter can be moved away from the work for permitting the latter to be removed from the carrier.

11. In a device of the class described, the combination of a work carrier, sets of reciprocatory bars, the bars of one set being alternated with the bars of the other set, oscillating heddles disposed adjacent the said bars, and the heddles having two sets of spaced registering fingers, one set of fingers of each heddle registering with one set of bars and the other set of fingers registering with the other set of bars, means for positively actuating one heddle and causing such heddle to oscillate the other one, a reciprocatory needle for laying warp threads between the heddles and woof threads between the warp threads as the latter are formed into a shed by the heddles, means for turning the work holder after the warp threads are laid to permit the laying of the woof threads, and means for moving the work carrier step by step.

12. A device of the class described comprising a carrier for the work, a bed on which the carrier reciprocates, a reciprocatory needle for laying the warp and woof threads, a shuttle coöperating with the needle for locking the threads, means for turning the carrier before beginning its return movement, and means for alternating the shed of the warp threads.

13. A device of the class described comprising a carrier for the work, a bed on which the carrier reciprocates, a reciprocatory needle for laying the warp and woof threads, a shuttle coöperating with the needle for locking the threads, means for turning the carrier before beginning its return movement, means for alternating the shed of the warp threads, and an escapement device for controlling the movement of the carrier.

14. The combination of a carrier having a forward warp laying movement and a backward woof laying movement and an intermediate turning movement, a reciprocatory needle for laying the thread, and a reciprocatory shuttle at the side of the carrier opposite from the needle for interlocking the threads in the work.

15. The combination of a carrier having a forward warp laying movement and a backward woof laying movement and an intermediate turning movement, a reciprocatory needle for laying the thread, a reciprocatory shuttle at the side of the carrier opposite from the needle for interlocking the threads in the work, heddle means for forming the warp threads into a shed, and a common actuator for the heddle means, needle and shuttle.

16. A device of the class described comprising a work carrier, means for moving the same step by step in a forward and backward direction for the laying of the warp and woof threads and for turning the carrier before it begins its backward movement, a needle frame, a needle therein for laying the warp and woof threads, an escapement actuated by the needle frame for producing a step by step movement of the carrier, and a shuttle coöperating with the needle for interlocking the threads in the work.

17. A device of the class described comprising a bed, a work carrier, means for limiting the motion of the carrier to a forward and backward movement, and an intermediate turning movement, a single element operatively connected with the carrier for causing its successive motions, coöperating heddles movable with the carrier and between which the warp and woof threads are adapted to be laid in the work, a reciprocatory needle past which the carrier moves, and a shuttle coöperating with the needle to interlock the threads.

CHARLES M. FYFE.

In presence of—
CHRISTIAN C. W. GRASSMANN.